July 8, 1947.  E. R. STEWART  2,423,528
HELICOPTER NAVIGATION LIGHT
Filed July 12, 1944   3 Sheets-Sheet 1
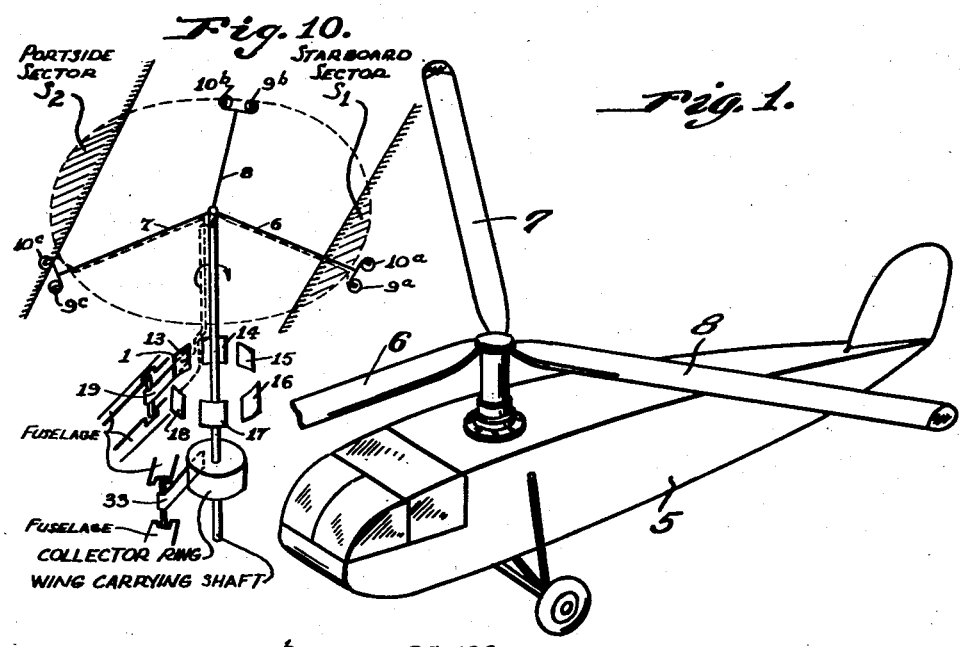
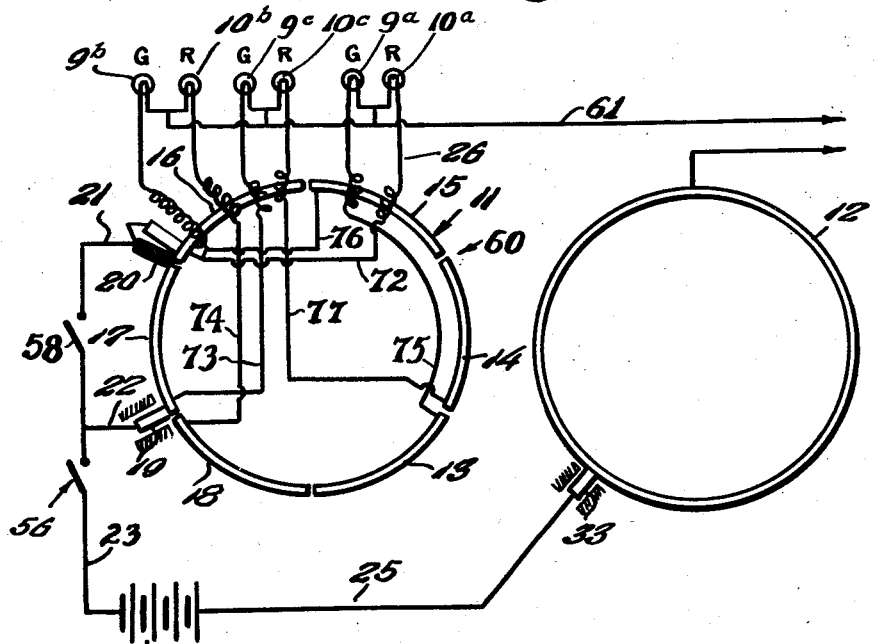
Inventor
EVERETT R. STEWART,
By *Clarence A. O'Brien*
and *Harvey B. Jacobson*
Attorneys July 8, 1947.　　　E. R. STEWART　　　2,423,528
HELICOPTER NAVIGATION LIGHT
Filed July 12, 1944　　　3 Sheets-Sheet 2
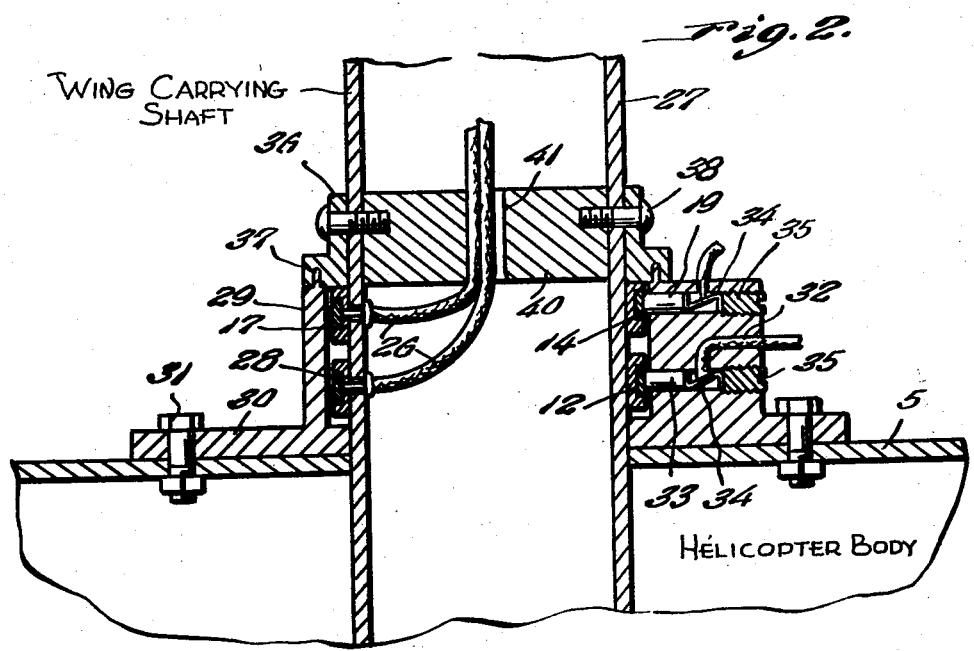
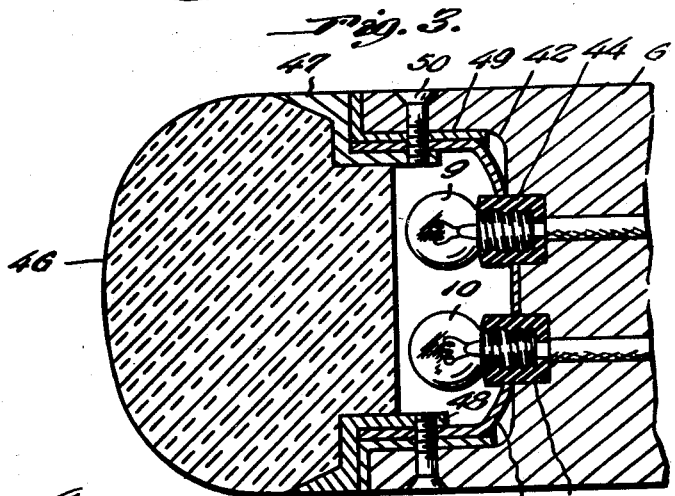
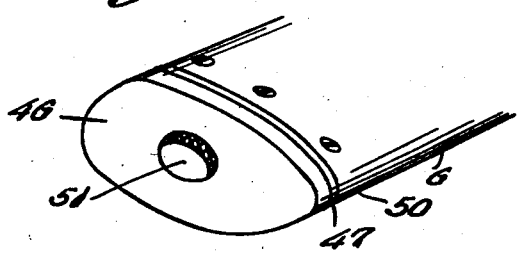
Inventor
EVERETT R. STEWART,
By *Clarence A. O'Brien*
and *Harvey B. Jacobson*
Attorneys

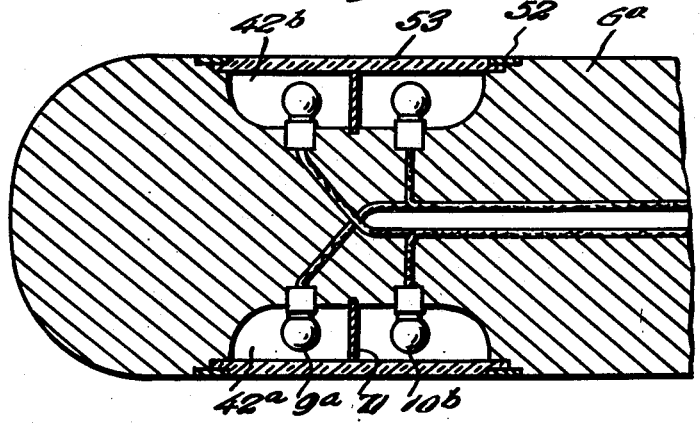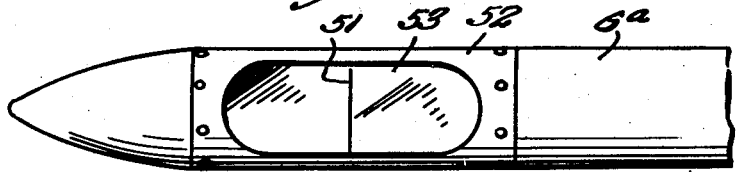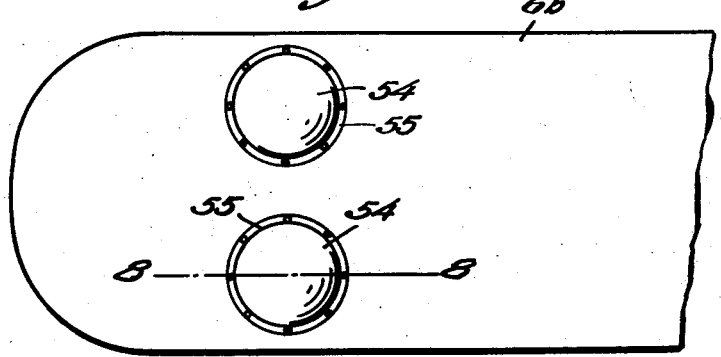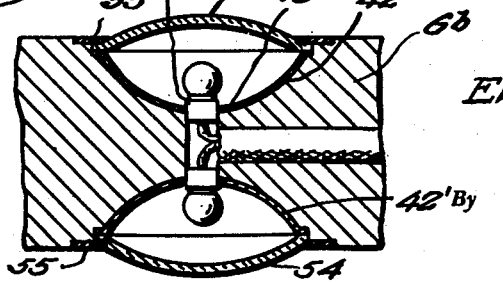

Patented July 8, 1947

2,423,528

UNITED STATES PATENT OFFICE 2,423,528

HELICOPTER NAVIGATION LIGHT

Everett R. Stewart, Glendale, Calif.

Application July 12, 1944, Serial No. 544,578

5 Claims. (Cl. 177—329)

1

This invention relates to new and useful improvements in navigation lights especially adapted for use on helicopters.

The principal object of the present invention is to provide navigation lights for helicopters wherein the proper colored lights will illuminate on the designated sides of the aircraft, as the helicopter wings rotate, this being accomplished through the medium of unique make and break device for making and breaking the lamp circuit depending upon the position of the wings.

Another important object of the invention is to provide navigating lights for helicopter wings which will function fool-proofly and be easily accessible for the purpose of repairs or replacements.

Other objects and advantages of the invention will become apparent to the reader of the following description.

In the drawings:

Figure 1 represents a perspective view of a helicopter showing the wings provided with the navigating lights.

Figure 2 is a fragmentary enlarged vertical sectional view through the drive shaft showing the make and break means.

Figure 3 is a fragmentary horizontal sectional view through one of the wing tips showing the improved navigation light structure.

Figure 4 is a fragmentary perspective view showing one wing tip and the corresponding navigation light structure.

Figure 5 is a fragmentary longitudinal sectional view through a wing tip showing a modified form of navigation light structure.

Figure 6 is a fragmentary edge elevational view of the wing structure shown in Figure 5.

Figure 7 is a fragmentary top plan view of a wing showing still another improved navigation light structure.

Figure 8 is a fragmentary detailed sectional view taken substantially on the line 8—8 of Figure 7.

Figure 9 is a diagrammatic view showing the electrical connection between the electrical devices involved.

Figure 10 is a diagrammatic view of the installation illustrating the periods of operation of the lights on the wings or vanes.

Referring to the drawings wherein like numerals designate like parts, it can be seen that numeral 5 denotes the fuselage of a helicopter, while numerals 6, 7 and 8 denote the usual revolving wings or vanes.

According to navigation laws, aircraft should

2 have a red light display on its left wing tip and a green light on its right wing tip, but this has not been possible with helicopters.

Lamps attached to the fuselage of a helicopter do not fulfill navigational requirements as the angle under which these lights and the head and tail lights are viewed from another craft is so small that the direction of flight can not be clearly distinguished.

In order to place the navigational lights at a suitable distance they have to be attached to the tip of the rotating vanes or wings of the helicopter.

At or adjacent the ends of each wing or vane 6, 7, 8, preferably on the tip of the wing a pair of light bulbs 9, 10 is mounted, one of them being a green light (indicated by the letter G in the diagram Figure 9), the other being the red light (indicated by letter R) as prescribed by the rules.

The reference numerals 9, 10 refer to the light bulbs in general. Where light bulbs mounted on definite wing sections are referred to, the light bulbs are distinguished by means of indices $a, b, c,$ ... added to the reference numerals 9, 10.

Both types of lights are mounted on each wing tip as they are operated intermittently and alternatively.

The principle according to which these lights are operated consists in lighting the green light on each wing or vane tip when the latter, during its revolution, passes the starboard sector of the circle described during revolution. During the remaining part of the revolution the light is extinguished. Similarly, the red light is operated when the wing tip passes the portside sector of the circle in which it performs its revolution. It is thus seen that each light 9, 10 operates intermittently and is lighted during part of the revolution of the wing or vane, while it is extinguished during the remainder of the revolution.

In spite of this intermittent lighting of the bulbs a craft crossing the course of the helicopter has the impression of permanent and constantly burning lights mounted at a distance approximately equal to the diameter of the circle within which the wings or vanes are revolving. As these wings revolve at a speed which is almost invariably larger than that which produces an interval between successive blades of $\frac{1}{16}$ sec., the succession of lights which are in reality appearing and disappearing and coming and going is not perceived. Even if the speed should occasionally drop below the above limit, the impression would be the same, although pulsations or regular flickering would be perceivable.

In order to operate the lights on the helicopter wings 6, 7, 8, of which three are shown in the drawing, the shaft 27 carrying the wings or vanes is provided with a commutator-like contact ring 60 which consists of a number of contact strips or segments 13, 14, 15, 16, 17, 18, separated by gaps or by insulated material. Six contact segments are illustrated in the diagrams Figures 9 and 10, but it is to be understood that this number has only been selected for the purpose of illustration. In fact, the number of segments depends on the number of wings and of lamps used. And the grouping and spacing of the segments around the shaft which is shown as continuous and uniform on the diagram Figure 9 depends on the position of the wings or vanes and on the length of the arc or sector of the circle along which the lights are to be turned on. The length of this arc in its turn depends on the location of the lights on the wings, and especially on the fact whether they are so located as to be seen by a spectator in another craft during the entire period during which they move along the sector which is lighted, or whether they disappear for a spectator during such movement while still lighted.

Each segment 13, 14, 15 . . . is connected with one of the lamps 9a, 9b, 9c . . . , and 10a, 10b, 10c, . . . respectively. The latter therefore burn as long as the segment with which they are connected is energized. Moreover, each lamp 9a, 9b, 9c . . . , 10a, 10b, 10c . . . is connected with a collector ring 12 by means of a conductor 61 which is mounted on the shaft 27, above or below the commutator like contact segment ring 60.

Current is supplied to the contact segment ring 60 and to the collector ring 12 by means of brushes 19 and 33, respectively. These brushes are fixed on the fuselage or on some member in fixed relation therewith and they are connected with the two supply leads 23 and 25 leading to a battery 24 or to any other source of current.

By virtue of the fixed relation of the brush 19 with respect to the fuselage, the segment which happens to be energized during the rotation of the ring, too, has a fixed relation with respect to the said fuselage. As this segment is connected with one of the lamps on the wing tips it is manifest that zones exist, which are in fixed relation to the fuselage and which contain the sectors $S_1$ and $S_2$ along which the red and green lights are on. This is clearly shown in Figure 10, which in conjunction with Figure 1 shows that lighted red and green zones or strips may be maintained in exact parallelism to the sides or the longitudinal axis of the helicopter.

From Figure 10 it will be seen that when the portside and starboard sections $S_1$ and $S_2$ have an appropriate length (not exceeding about ¼ of the entire periphery of the circle described by the wing tips), the lamps lighted during the passage of the wing tip through one section only are not operative simultaneously and they may therefore be lit in succession. Consequently the red and green lights may be connected with adjacent sections coming successively into contact with brush 19.

The common return conductor 61 of the red and green lights leads back to the battery by means of collector ring 12, which is attached to stop 27 below contact ring 60.

In operation the red and green lights are lighted on the port and starboard side in the following manner.

Assuming the rotating wings of the helicopter to be in the position shown in Figure 10 it is seen that in this case wing 6 with green light 9a is running through the starboard section $S_1$. During this passage the green light 9a is lighted, the circuit running from battery 24 over line 23, switch 56, line 22, brush 19, segment 13 (assumed to be in contact with brush 19 during this phase as shown in Figure 10) conductor 75, green light 9a, return conductor 61, collector ring 12, brush 33, conductor 25. This circuit remains closed until segment 13 leaves the brush, which will now come into contact with segment 14. This segment comes into contact with the brush when wing tip 7 has entered portside sector $S_1$ and therefore red light 10c has to be lighted. The circuit from battery 24 is closed over 23, 56, 22, 19 and segment 14, conductor 77 to red light 10c and over 61, 12, 33, 25 back to battery. When wing tip 7 leaves the portside sector $S_2$, wing tip 8 enters on starboard sector $S_1$ and therefore the green light 9c on this wing has to be lit. This occurs when segment 15 comes under brush 19 whereby the circuit is again closed in the way described as far as the brush, and runs from segment 15 over conductor 76 to green light 9c, and return conductor 61 connected with the battery over 12, 33, 25. The operation proceeds in the same way, one lamp being always extinguished when a segment leaves the brush, and the wing tip carrying it, leaves one of the sectors, while one lamp is always lit when a fresh sector comes into contact with the brush.

When the sectors are of such extension that the lamp on one wing, say 6, should still remain lighted for a while, when the lamp on another sector should go into operation, the two brushes 19 and 20 are used which are to be spaced in such angular relation, that the trailing sector has not yet left the brush 19 when the leading sector has already made contact with brush 20.

The brush 20 may be arranged in a branch 21 of the circuit 23 which is provided with a switch 58. In the arrangement shown in Figure 9 the brush 20 is so located that the two brushes always rest on adjacent segments of the contact ring. This arrangement is provided for the purpose of lighting the navigation lights while the helicopter is on the ground. The switch 58 in this case is normally open and is only closed when the helicopter is parked. One of the red and one of the green lights, each located somewhere within its sector, will then be lighted.

The construction of the various parts above mentioned may be seen by referring to Figures 2 to 8.

Referring to Figure 2, it can be seen that numeral 27 denotes the main rotor shaft of the helicopter which extends upwardly through the top of the fuselage 5. On the fuselage 5 is the contact ring housing 28, the same consisting of a side wall structure 29 and a flanged base 30 secured by bolts or other means 31 to the fuselage 5. The wall structure 29 has a thickened portion 32 in which the brushes 19 and 20 are disposed, and also in which a brush 33 for the collector 12 is mounted. The brushes are provided with springs 34 against which adjusting screws 35 are operative.

A grooved seal ring 36 is secured to the drive shaft 27 and receives a rib or tongue 37 rising from the upper portion of the housing wall 29. Screws 38 extend through the seal ring 36 and into the shaft 27, the same penetrating a partition 40 within the shaft which has an opening 41 therethrough. Through the opening 41 are disposable the conductors 26 to the various lamp bulbs.

Each wing tip has a pocket 42 formed therein for receiving a reflector 43 and disposed through the reflector are sockets 44, 45 for containing green and red lamp bulbs 9a, 10a.

Numeral 46 denotes a bull's eye or lens having a rim 47, this rim being provided with a flange 48 adapted to interlap the outer portion of the reflector 43. A weather-proofing member 49 is interposed between the rim 47 and the wing 6 and also between the outer portion of the reflector 43 and the wing 6 and as can be clearly seen in Figure 3, the parts 43, 47 and 49 are firmly and positively held together by screws 50.

As can be seen in Figure 4, the outer portion of the bull's eye 46 may be formed with a threaded opening for receiving a threaded plug 51 so that access may be had to the bulbs 9a, 10a.

Figures 5 and 6 disclose a modification of the light structure. In these two views, reference character 6a denotes a wing tip portion having recesses 42a, 42b in the lead and trail edges thereof, each recess or pocket containing green and red light bulbs 9a, 10a and between each pair of light bulbs, that is, in each pocket 42a, 42b is a partition 71 and it is preferable that the sides of this partition be silvered or otherwise prepared to act as a reflecting surface. Plates 52 are secured over these edge portions of the wing 6a and the plates have openings therein closed by a window or pane 53 curved to conform with the curvature of the corresponding edge portion of the wing.

Figures 7 and 8 show a third form of light structure. As shown in Figure 8, the top and bottom portions of the wing 6b are formed each with a pair of recesses 42' and each recess contains a reflector 43a and a lamp socket 44a. The lamp sockets of the top side of the wing contain green and red bulbs, while the sockets of the lower side of the wing contain, one a green bulb and the other a red bulb. The recesses of the top and bottom sides of the wing 6b are provided with lenses 54 and suitable retaining rims 55.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a navigational light arrangement for helicopters provided with a fuselage, with rotating wings and with a shaft for carrying and rotating said wings, a navigational light structure arranged in a recess of the wing tip and a transparent closure for said recess, the light structure on each wing tip comprising a pair of differently colored electric lights, adapted to be operated alternatively, operative circuits for said lights; a contact ring provided with contact segments, each segment being connected with one of the navigational lights, said contact ring being fixedly associated with the shaft carrying the wings, a source of current, a brush located in fixed connection with said fuselage and connected with said source of current, a collector ring associated with said shaft and a brush cooperating with said ring, a common return conductor for all operative currents connected with the said collector ring, and a return connection between the last-named brush and the source of current.

2. A navigational light arrangement for helicopters and similar craft having a rotating member, provided with wings, and a shaft carrying the same, comprising a navigational light structure on each wing, said structure including navigational signal lamps having different characteristics, operative circuits for each of said lamps, and means for operating each signal lamp during part of the rotational movement of the wing carrying said lamp structure, said means including contact segments forming part of a ring operatively associated with the wing carrying shaft for controlling the operation of the lamp circuits.

3. A navigational light arrangement for helicopters and similar craft, having a rotating member provided with a body and with wings, and with a shaft carrying the latter, comprising a navigational light structure on each wing, said structure including navigational signal lamps having different characteristics, an operative circuit for each navigational signal lamp, means for lighting the said navigational signal lamps with different characteristics, said means comprising a contact ring, provided with a number of segments, each segment connected with one of the navigational lamp circuits, said contact ring being associated with the wing carrying shaft, a source of current, fixed brush members cooperating with the contact segments, connected with said source of current, said brushes being located in fixed relation with respect to the body of the craft, so as to control the operation of the navigational lamps in relation to their position with respect to said body during the rotational movement of the wing.

4. A navigational light arrangement as specified in claim 2 wherein the rotating wing is provided with a recess at the wing tip, a transparent closure for said recess, the navigational light structure with navigational signal lights of different characteristics being located within said recess.

5. A navigational light arrangement as specified in claim 2 wherein the rotating wing is provided with recesses at opposite sides of the wings facing different directions with a navigational light structure located in each of the recesses.

EVERETT R. STEWART.